US006412053B2

(12) United States Patent
Bonola

(10) Patent No.: US 6,412,053 B2
(45) Date of Patent: *Jun. 25, 2002

(54) SYSTEM METHOD AND APPARATUS FOR PROVIDING LINEARLY SCALABLE DYNAMIC MEMORY MANAGEMENT IN A MULTIPROCESSING SYSTEM

(75) Inventor: Thomas J. Bonola, Tomball, TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,210

(22) Filed: Aug. 26, 1998

(51) Int. Cl.[7] .................................. G06F 12/00
(52) U.S. Cl. ................ 711/170; 711/171; 711/172; 711/173
(58) Field of Search ................ 711/170, 171, 711/172, 173

(56) References Cited

U.S. PATENT DOCUMENTS

| | | | | |
|---|---|---|---|---|
| 5,561,786 A | * | 10/1996 | Morse | 395/497.01 |
| 5,784,699 A | * | 7/1998 | McMahon et al. | 711/171 |
| 5,809,554 A | * | 9/1998 | Benayon et al. | 711/171 |
| 5,930,827 A | * | 7/1999 | Sturges | 711/170 |
| 5,949,972 A | * | 9/1999 | Applegate | 395/185.07 |
| 6,047,280 A | * | 4/2000 | Ashby et al. | 707/2 |

OTHER PUBLICATIONS

Mendel, Brett; "Server I/O all set to flow"; *Lantimes*, Oct. 27, 1997, vol. 14, Issue 22; cover page and p. 31.

Briggs, Chris; "Smarter and Faster I/O for Servers"; CORE: Operating Systems; *Byte*, May 1, 1996, vol. 2, No. 5.

Thompson, Tom; "I2O Beats I/O Bottlenecks"; *Byte*, Aug. 1997, pp. 85, 86, and 3 additional pages.

I2O Introduction; Technology Backgrounder; Aug. 13, 1997; http://www.i2osig.org/Architecture/TechBack.html.

i960®RP I/O Processor—the I2O SIG site; http://134.134.214.1/design/iio/i2osig.html; Feb. 6, 1998.

"Welcome to the I2O SIG® Web Site!"; http://www.i2osig.org; Feb. 6, 1998.

"About I2O Technology"; http://www.i2osig.org/Architecture; Feb. 6, 1998.

"Technology Backgrounder"; http://www.i2osig.org/Architecture/TechBack/html; Feb. 6, 1998; 6 pages.

"Questions and Answers"; http://www.i2osig.org/Architecture/QandA.html; Feb. 6, 1998; 4 pages.

"I2O® Specifications For Non–Members"; http://www.i2osig.org/Architecture/GetSpec.html; Feb. 6, 1998.

Amdahl, Carlton G.; "I2O Future Directions"; http://www.i2osig.org; Jun. 1996; 12 pages.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

(List continued on next page.)

Primary Examiner—Matthew Kim
Assistant Examiner—Pierre M Vital
(74) Attorney, Agent, or Firm—Fletcher, Yoder & Van Someren

(57) ABSTRACT

A system and method for dynamically allocating memory in a computer system at the application level. The application examines a heap data structure and a free list, identifies an unallocated region of memory that is appropriately sized, and allocates the memory to the application. The application deallocates a memory region by placing the memory region in the free list and modifying the heap data structure.

2 Claims, 7 Drawing Sheets

OTHER PUBLICATIONS

Listing of Press Releases; http://altavista.digital.com/cgi–bin/quer...=21%2FMar%2F86&d1=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

"HP Demonstrates Commitment to I2O Standard With New I2O Disk–array Controller"; *Hewlett Packard;* Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

\* cited by examiner

SYSTEM METHOD AND APPARATUS FOR PROVIDING LINEARLY SCALABLE DYNAMIC MEMORY MANAGEMENT IN A MULTIPROCESSING SYSTEM

BACKGROUND OF THE INVENTION

1. Field of the Invention

The present invention relates to a computer system using intelligent input-output, and more particularly, to a system and method for providing linearly scalable dynamic memory management in a multiprocessing system.

2. Description of Related Art

A conventional computer system typically includes one or more central processing units (CPUs) capable of executing various sequential sets of instructions, known as threads. Originally, a computer system included a single CPU capable of performing a single thread at a given time. Advances in operating systems have provided a technique for sharing a single CPU among multiple threads, known as multitasking. The development of multiprocessing brought computer systems with multiple CPUs, each executing a different thread at the same time.

There are many variations on the basic theme of multiprocessing. In general, the differences are related to how independently the various processors operate and how the workload among these processors is distributed. In loosely-coupled multiprocessing, the processors execute related threads, but, they do so as if they were stand-alone processors. Each processor may have its own memory and may even have its own mass storage. Further, each processor typically runs its own copy of an operating system, and communicates with the other processor or processors through a message-passing scheme, much like devices communicating over a local-area network. Loosely-coupled multiprocessing has been widely used in mainframes and minicomputers, but the software to do it is very closely tied to the hardware design. For this reason, it has not gained the support of software vendors, and is not widely used in PC servers.

In tightly-coupled multiprocessing, by contrast, the operations of the processors are more closely integrated. They typically share memory, and may even have a shared cache. The processors may not be identical to each other, and may or may not execute similar threads. However, they typically share other system resources such as mass storage and input/output (I/O). Moreover, instead of a separate copy of the operating system for each processor, they typically run a single copy, with the operating system handling the coordination of threads between the processors. The sharing of system resources makes tightly-coupled multiprocessing less expensive, and it is the dominant multiprocessor architecture in network servers.

Hardware architectures for tightly-coupled multiprocessing systems can be further divided into two broad categories. In symmetrical multiprocessor systems, system resources such as memory and disk input/output are shared by all the microprocessors in the system. The workload is distributed evenly to available processors so that one does not sit idle while another is loaded with a specific thread. The performance of SMP systems generally increases for all threads as more processor units are added.

An important goal in the design of multiprocessing systems is linear scalability. In a completely linearly scalable system, the performance of the system increases linearly with the addition of each CPU. The performance of the system is measured in the number of instructions that the system as a whole completes in a given time. However, in most multiprocessing systems, as the number of CPUs are increased, the performance gain realized by adding an additional CPU decreases and becomes negligible.

A common problem with multiprocessing occurs when more than one thread attempts to read or write to a common or shared memory. Those skilled in the art will recognize the data corruption that would occur if one thread were to read a set of memory locations while another thread were to write to the same set of memory locations. Common memory locations that are frequently accessed by various threads are the heap data structure and the free list. A heap is a portion of memory that is divided into smaller partitions. Each partition is allocatable on demand to store data for the need of particular threads. Once the data stored in the partition is no longer needed by the thread, the partition is returned to the heap. The heap data structure and the free list keep track of which partitions are allocated to the various threads, and which partitions are unallocated. When a thread is in need of memory, the heap data structure and free list are accessed to assign an unallocated partition of the heap to the thread. When the thread is no longer in need of the partition of memory, the partition of memory is returned to the heap. The heap data structure and free list are updated to reflect that the partition of memory is now unallocated.

The management of concurrent threads is performed by the operating system of the computer system which allocates various resources among various threads. The threads accessing the heap data structure and free list are synchronized by the operating system. In order to access the heap data structure and free list, a thread makes a call into the operating system. The actual access is performed at the operating system level. Consequently, by accessing heap data structure and free list at the operating system level, the accesses by each thread can be synchronized to prevent more than one thread from accessing the heap data structure and free list at the same time.

The operating system prevents simultaneous access to the heap data structure and free list by using spinlocks and interrupt masks. While accessing the heap data structure and free list through calls to the operating system prevents simultaneous access by the various threads, there are a number of associated drawbacks. The use of spinlocks and interrupt masking requires threads to wait while another thread is accessing the heap data structure or free list. Requiring threads to wait while another thread is accessing the heap data structure or free list substantially curtails the benefits of concurrent thread execution. As more CPUs are added, a bottleneck could potentially be created as each thread awaits access to the heap data structure and free list.

Another problem occurs because of the transition from the thread to the operating system. Normally, while a thread is being performed, the instructions of the thread are being executed, known as the application mode. When the thread makes a call to the operating system to access the heap data structure or free list, the access is performed at the operating system level, known as the kernel mode. Changing execution modes causes substantial time delays.

SUMMARY OF THE INVENTION

The present invention is directed to a system and method for dynamically managing memory in a computer system by executing an instruction within an application program causing the application program to access a heap data structure and a free list containing the addresses of unallocated regions of memory, determining the address of an appropriately sized region of memory, and allocating the region of memory to the application program.

The present invention is also directed to a method for dynamically deallocating memory in a computer system by causing an application program to place the address of a region of memory in a free list, and modifying an entry in the heap data structure.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

The numerous innovative teachings of the present application will be described with particular reference to presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
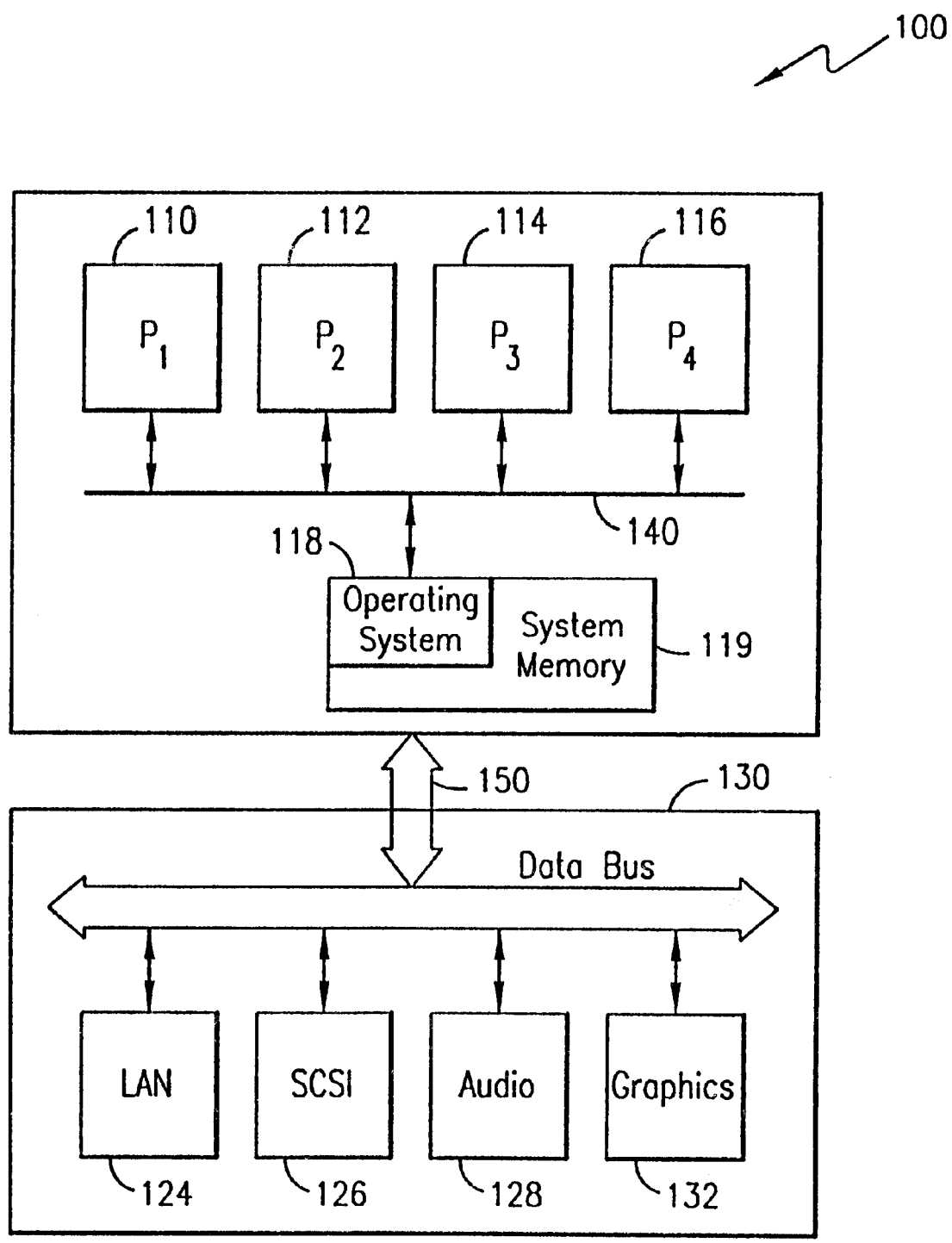
FIG. 1 is an illustration of a computer system embodying the present invention.

Referring now to the drawings wherein like or similar elements are designated with identical reference numerals throughout the several views, and wherein the various elements depicted are not necessarily drawn to scale, and, in particular to FIG. 1, there is illustrated a schematic block diagram of a computer system 100. As illustrated, computer system 100 is a multiprocessor system and contains multiple host processors 110, 112, 114 and 116; system memory 119 storing an operating system 118; and associated hardware 130. As depicted, the associated hardware 130 includes items such as LAN controller 124, SCSI controller 126, an audio controller 128, and a graphics controller 132.

As computer system 100 is a multiprocessing computer, it is able to execute multiple threads simultaneously, one for each of the processors therein. Further, it is contemplated that the computer system 100 can operate asymmetrically, symmetrically, or both symmetrically and asymmetrically.

Figure 2:
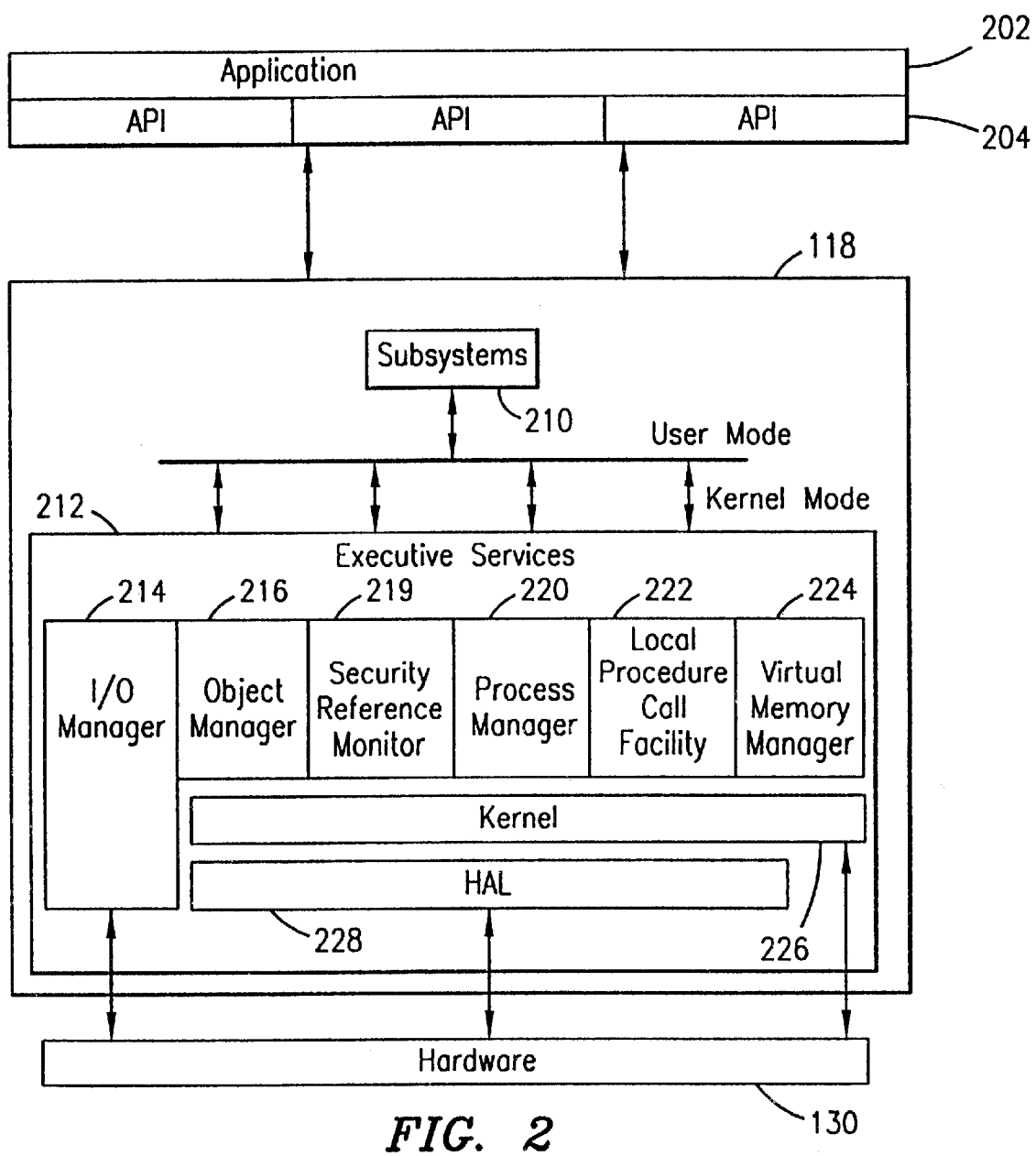
FIG. 2 is an illustration of an exemplary operating system embodying the present invention.

Referring now to FIG. 2, there is illustrated a more detailed block diagram of an exemplary operating system 118. Applications 202 utilized in a computer system are kept separate from the operating system 118 itself. Operating system 118 runs in a privileged processor mode known as kernel-mode and has access to system data and hardware. Applications 202 run in a non-privileged processor mode known as user mode and have limited access to system data and hardware through a set of tightly controlled application programming interfaces (APIs) 204.

As depicted, the architecture of operating system 118 is a kernel based operating system. Operating system 118 includes subsystems 210 (which operate in user mode), and system or executive services 212 (which operate in kernel mode). Executive services 212 may typically comprise multiple components, such as the I/O manager 214, the object manager 216, the security reference monitor 219, the process manager 220, the local procedure call facility 222, the virtual memory manager 224, the kernel 226, and the hardware abstraction layer (HAL) 228. The components that make up the executive services provide basic operating system services to the subsystems 210 and to each other. The components are generally completely independent of one another and communicate through controlled interfaces.

Still referring to FIG. 2, the I/O manager 214 manages all input and output for the operating system 118 including the managing of the communications between drivers of the computer system. Object manager 216 is for creating, managing, and deleting executive objects. Security reference monitor 219 is utilized to ensure proper authorization before allowing access to system resources such as memory, I/O devices, files and directories. Process manager 220 manages the creation and deletion of processes by providing a standard set of services for creating and using threads and processes in the context of a particular subsystem environment. Local procedure call facility 222 is message-passing mechanism for controlling communication between the client and server when they are on the same machine. Virtual memory manager 224 maps virtual addresses in the process' address space to physical pages in the computer's memory.

With further reference to FIG. 2, kernel 226 is the core of the architecture of operating system 118 and manages the most basic of the operating system functions. It is responsible for thread dispatching, multiprocessor synchronization, and hardware exception handling. The hardware abstraction layer (HAL) 228 is an isolation layer of software that hides, or abstracts, hardware differences from higher layers of the operating systems. Because of the HAL 228, the different types of hardware 130 all look alike to the operating system 118, removing the need to specifically tailor the operating system to the hardware 130 with which it communicates. Ideally, the HAL 228 provides routines that allow a single device driver to support the same device on all platforms. HAL routines are called from both the base operating system 218, including the kernel 226, and from the device drivers. The HAL 228 enables device drivers to support a wide variety of I/O architectures without having to be extensively modified. The HAL 228 is also responsible for hiding the details of symmetric multiprocessing hardware from the rest of the operating system.

An application 202 causes a processor 110, 112, 114 or 116 to allocate a portion of memory 119 (see FIG. 1) called a heap by including an instruction, HeapCreate(n). When the processor 110, 112, 114 or 116 executes the command HeapCreate(n), a continuous number of bytes, $2^M$, are set aside, wherein M is equal to the lowest integer power of 2 which equals or exceeds n. For example, for HeapCreate (5000), M=13, and a heap 302 containing $2^M$ or 8192 bytes is set aside.

Figure 3:
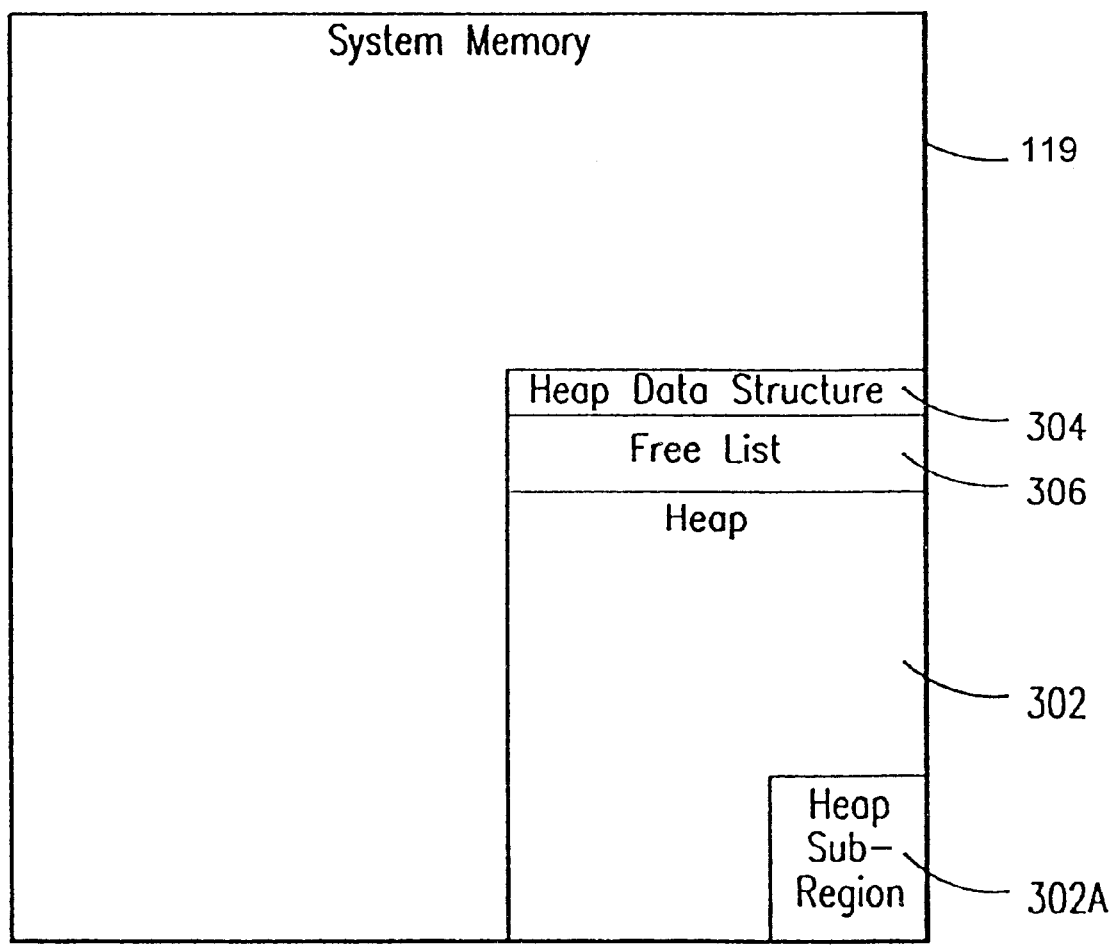
FIG. 3 is a diagram of system memory in accordance with the present invention.

Referring now to FIG. 3 a block diagram of the system memory 119 is described. Execution of a HeapCreate (n) command by a processor 110, 112, 114 or 116 causes a portion of system memory 119, or a heap 302 to be created. Associated with the heap 302 is a heap data structure 304 and a Free List 306. The heap 302 is a continuous portion of system memory 119 that is available for assignment to various different applications 202. Heap Subportions 302A can be created from the heap 302 and individually assigned to various applications 202. The heap 302 is managed according to an algorithm known in the art as the Binary Buddy Algorithm. In accordance with the Binary Buddy Algorithm, all heap subportions 302A comprise $2^n$ continuous bytes of memory, wherein N is an integer less than M.

Figure 4A:
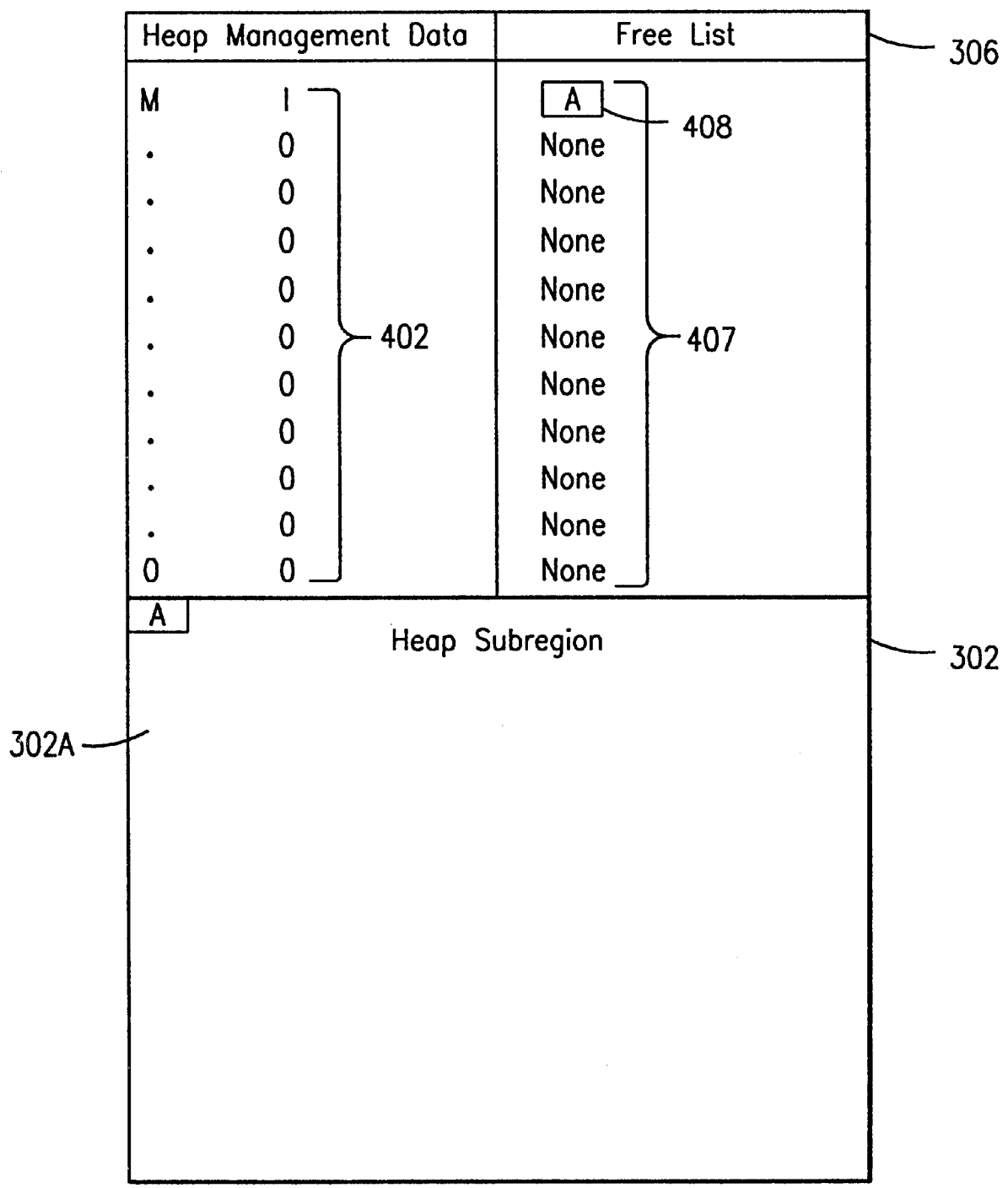
FIGS. 4A and 4B are diagrams of a heap data structure, a free list, and a heap in accordance with the present invention.
Figure 4B:
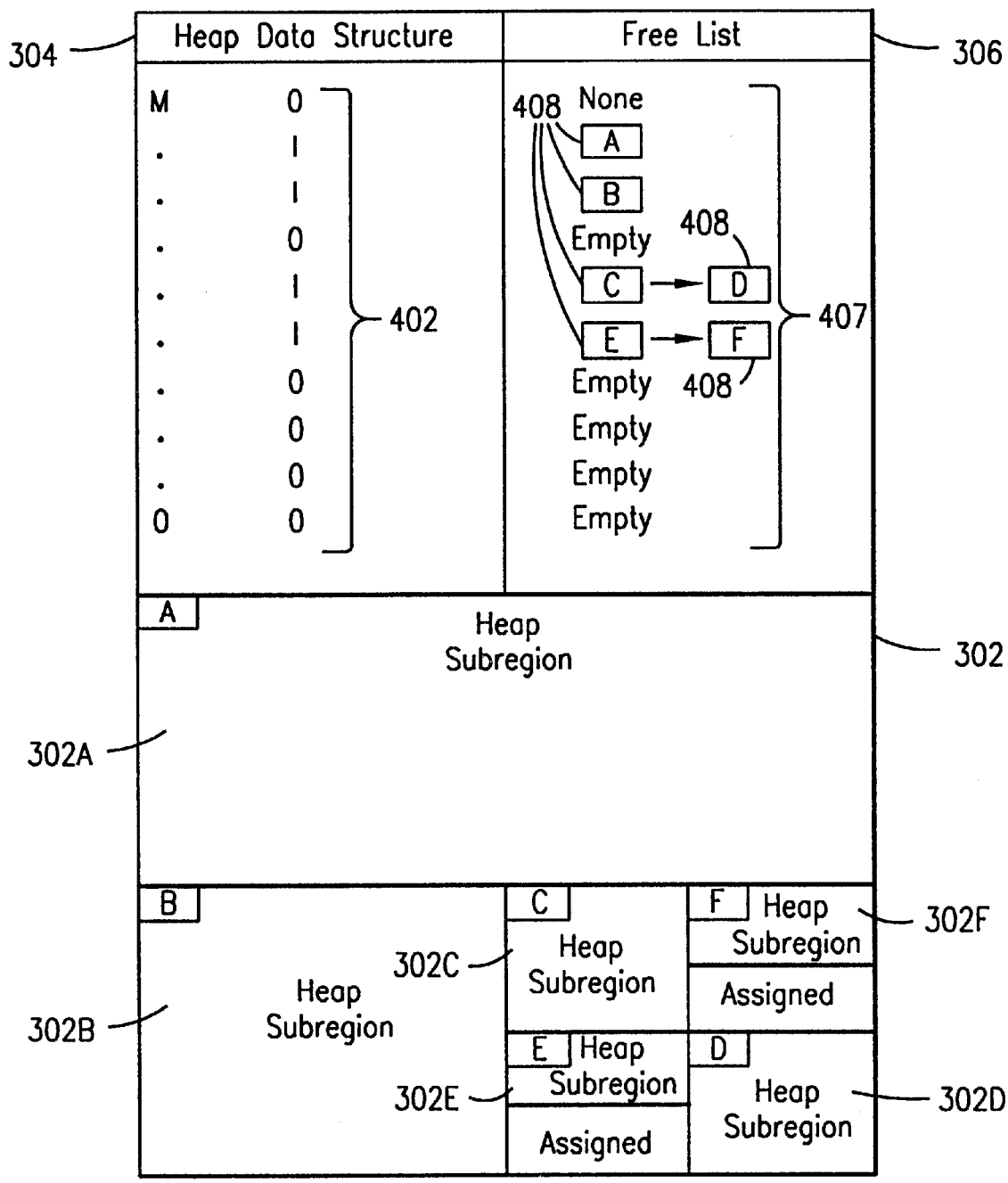

Referring now to FIGS. 4A and 4B, more detailed diagrams of the heap data structure 304, the free list 306, and the heap 302 of FIG. 3 are illustrated. Referring to FIG. 4A, the heap data structure 304 comprises an array of up to M+1 bits 402. The bits 402 are numbered starting from M and are sequentially descending until, at the minimum, zero. The free list 306 includes multiple lists 407 for each of the M+1 bits 402 in the heap data structure 304.

When the heap 302 is first created, the M bit M+1 bits 402 in the heap data structure 304 is set to 1, while all of the remaining bits of the M+1 402 are set to zero. In the free list 306, the list 407 corresponding to the M bit contains an entry 408 which is the address of the first byte of the heap 302. The initial settings of the heap data structure 304 and the free list 306 indicate that the heap 302 contains a region of continuous unassigned memory, $2^m$ bytes in size, beginning at the address contained in the entry 408 in the free list 306.

Those skilled in the art will appreciate that as heap subregions 302A are assigned to various applications 202, the heap 302 will contain regions of assigned memory scattered throughout the heap 302. Therefore, the unassigned memory in the heap 302 will be non-continuous. Instead, the unassigned memory will comprise a number of regions. Furthermore, because the heap contains $2^m$ bytes of memory and every region of assigned memory will contain $2^n$ bytes, where n<m, the region of unassigned memory will consist of a number of heap subregions 302A, each containing a number of bytes equal to an integer power of 2.

Referring now to FIG. 4B, the free list 306 contains lists 407 of entries 408 of every starting address of unassigned heap subregions 302A–302F.

The entries 408 are sorted according to the size of the represented heap subregion 302A–302F, such that there is a list of unassigned heap subregions 302A–302F, for each integer power of 2, up to $2^M$. Each bit 402 of the heap data structure 304 corresponds to a list in the free list 407 and is set to 1 if the list contains at least entry 408 containing an address of at least one heap subregion 302A–302F.

Accordingly, an application program can take a heap subregion 302A–302F of the heap 302 by including an instruction HeapAlloc(X, heapID) where X is the number of bytes required, and heapID is a pointer which will point to the beginning address of the heap at the completion of the instruction.

Figure 5:
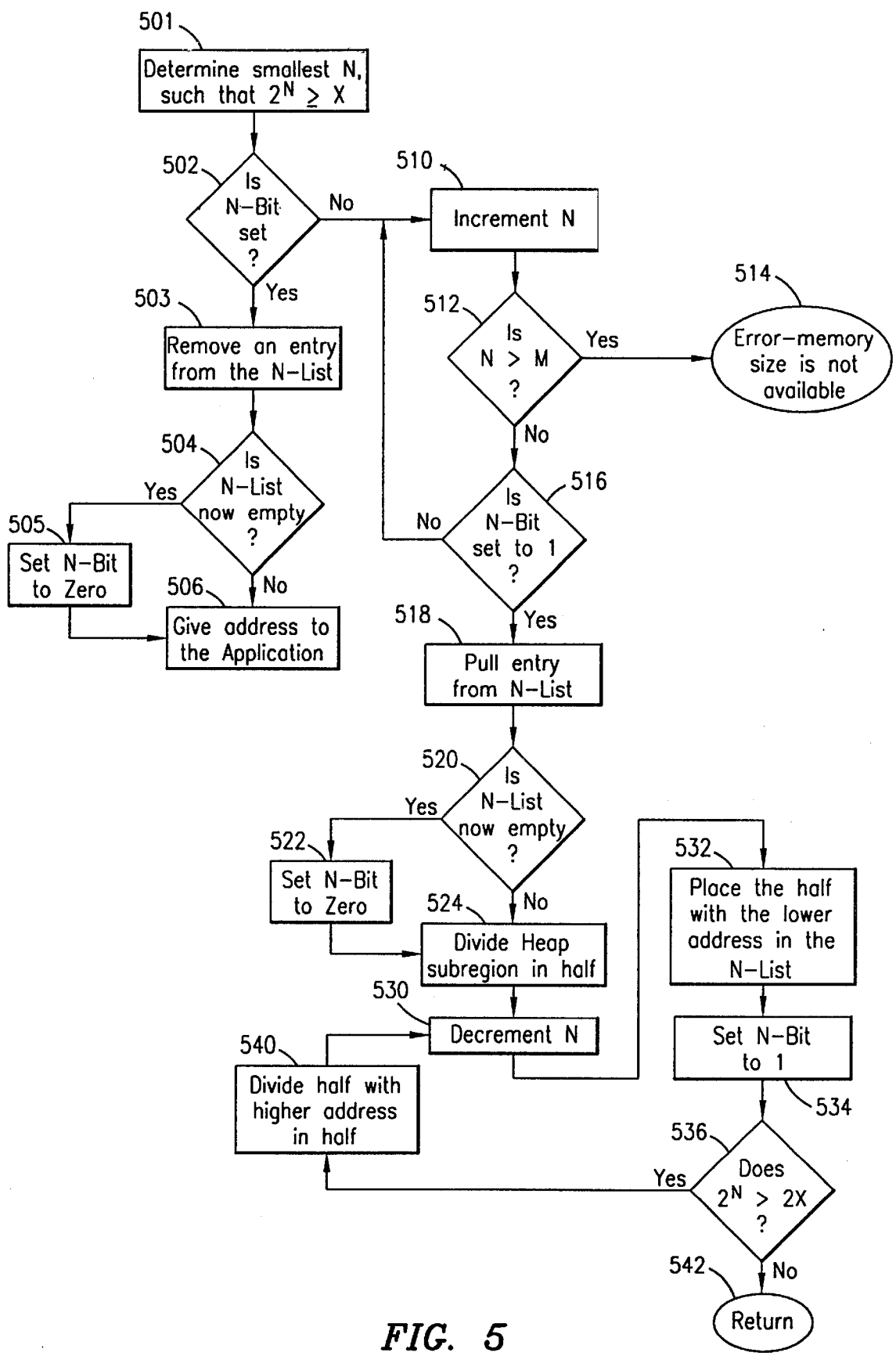
FIG. 5 is a flow chart illustrating the allocation of memory to an application program.

Referring now to FIG. 5, the process by which the processor 110, 112, 114, or 116 (see FIG. 1) executes the instruction HeapAlloc(X, heapID) is described. Referring to FIG. 5, the processor 110, 112, 114, or 116 begins by determining the lowest power, N, of 2 which equals or exceeds X (step 501). For example, if X=1000, N=10 and $2^{10}$=1024 bytes. The processor 110, 112, 114, or 116 can then examine the N bit 402 of the heap data structure 304 to determine if there is an appropriately sized heap subregion 302A–302F in the free list 306 (step 502). Where the N bit is set, an entry 408 containing an address to a heap subregion 302A–302F from the list 407 corresponding to the N bit 402 (the N list) is removed from the N list 407 (step 503). After removing the entry 408, the N list 407 is checked to if the list 407 has become empty (step 504). When the list has become empty, the N bit 402 in the heap data structure 304 is set to zero. In either case, the address of the heap subregion 302A–302F contained in the entry 408 is then assigned to the application 202.

Still referring to FIG. 5, where the N bit 402 is 0, the processor increments N (step 510) and begins examining the bits 402 of the heap data structure 304 in ascending order. The value of N is compared to M (step 512), and if N exceeds M, then the there is no heap subregion 302A–302F within heap 302 which can accommodate a demand for X bytes of memory from application 202. Accordingly, the HeapAlloc(X) instruction will fail for the application 202 (step 514). So long as N does not exceed M, the N bit 402 of the heap data structure 304 is examined (step 516). If the N bit 402 is not set to 1, N is incremented (step 510) and the process (step 512–516) is repeated. Once an N bit 402 is found that is set to 1, an entry 408 is removed from the N list 407, in the free list 306 (step 518). The N list 407 is now examined to see if the N list 407 is empty (step 520). Where the N list 407 is empty, the N bit 402 is set to zero (step 522). In either case, the heap subregion 302A–302F referred to by the entry 408 is divided into two heap subregions. It is noted that dividing a region of memory consisting of $2^N$ bytes in half will yield two regions of memory, each containing $2^{N-1}$ bytes.

Still referring to FIG. 5, N is decremented (step 530). The address of the heap subregion with the higher memory address is entered into the N list 407 of the free list 306 (step 532) and the N bit 402 in the heap data structure 302 is set to 1 (step 534). If the remaining half of the heap subregion contains twice as much memory as is required by the requesting application, the remaining half of the heap subregion can be further divided in half. On the other hand, if the remaining half of the subregion does not contain more than twice as much memory as is need by the requesting application, the remaining half of the subregion should be assigned. Accordingly, a comparison is performed to see if the remaining half of the heap subregion contains at least twice as much memory as is required (step 536). If the remaining half contains more than twice as much memory as is required, the remaining half is further divided in half (step 540), and steps 532–540 are repeated until a heap subregion is yielded which does not have twice as much memory as is required. The subregion is then assigned to the application (step 542).

When the application 202 is finished using an assigned heap subregion 302A–302F, it can return the heap subregion 302A–302F to the heap 302 by including an instruction HeapFree(heapID, X), where heapID is a pointer which points to the starting address of the heap subregion 302A–302F to be returned, and X is the number of bytes in the heap subregion 302A–302F.

Figure 6:
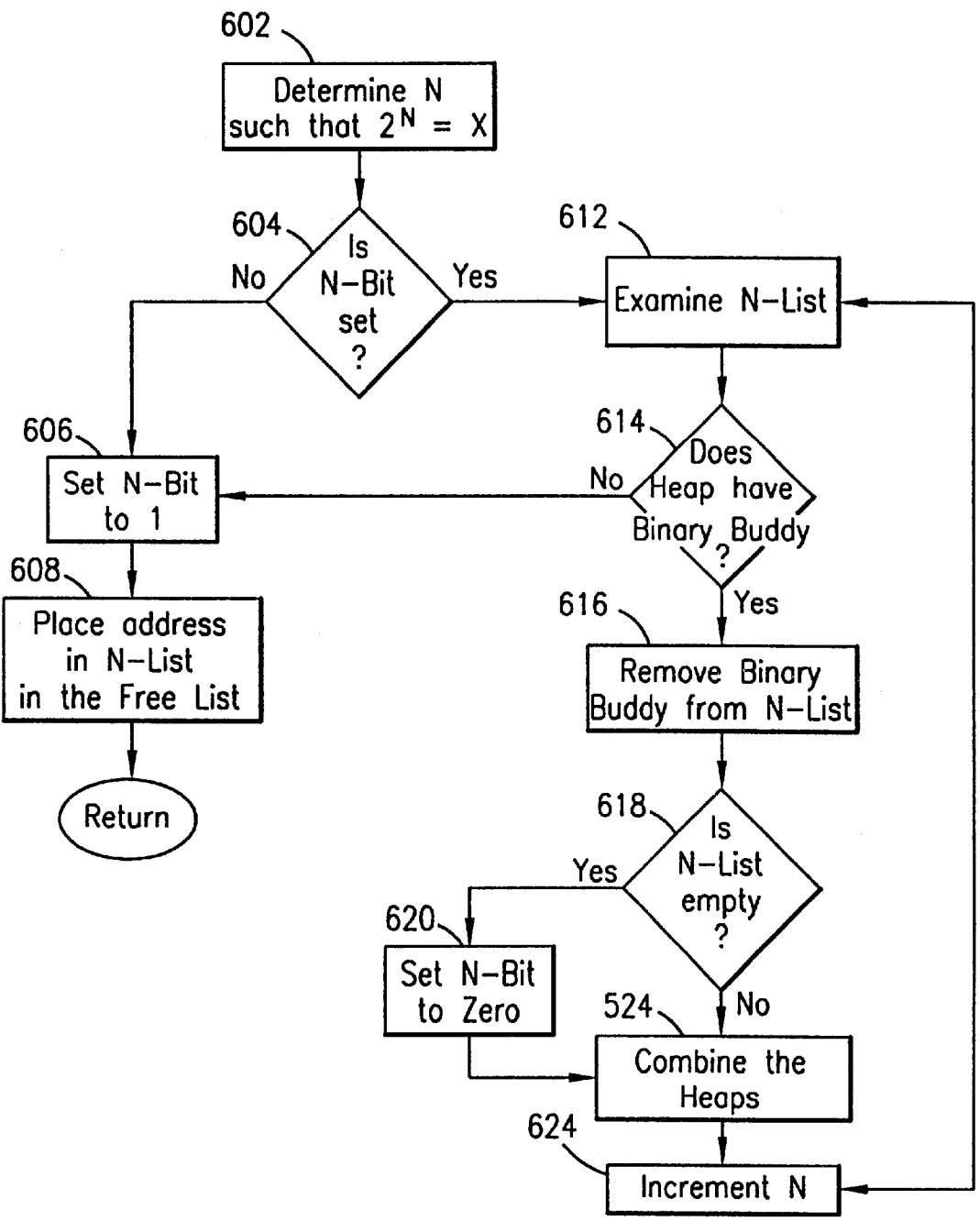
FIG. 6 is a flow chart illustrating the deallocation of memory from an application program.

Referring now to FIG. 6, the process by which the processor 110, 112, 114, or 116 executes the instruction HeapFree(heapID, X) is described. The processor 110, 112, 114, or 116 begins by determining an integer, N. such that $2^N$=X (step 602). The processor 110, 112, 114, or 116 then proceeds to determined whether the N bit 402 is set to 1 (step 604). Where the N bit 402 is set to zero, the processor 110, 112, 114, or 116 sets the N bit 402 to 1 (step 606) and places the address pointed to by the pointer heapID in the N list 407 (step 608), thus completing the instruction. If the N bit 402 is set to 1, (at step 604), the processor 110, 112, 114, or 116 proceeds to examine the N list 407 (step 612). The processor 110, 112, 114, or 116 examines the entries 408 in the N list 407 to try to find what is known in the art as a "Binary Buddy." When the heap 302 is first created, the heap 302 contains $2^M$ continuous bytes of unassigned memory.

As applications request assignment of memory, the heap 302 is progressively partitioned in half, such as in steps 524 and 540. The two partitions created in steps 524 or 540 are said to be Binary Buddies with respect to each other. In accordance with the Binary Buddy Algorithm, the processor 110, 112, 114, or 116 seeks, where possible, to reunite partitions created in steps 524 or 540. Determining whether a Binary Buddy exists in the N list 407 (step 614) can be done in a number of different ways. In one embodiment, the address of the Binary Buddy can be recorded in a predetermined address of each subregion 302A–302F at the time of partitioning in step 524 and 540. In another embodiment, the address of the Binary Buddy can be implicitly determined by examining the address of the heap subregion 302A–302F. For example, if a heap 302 containing $2^M$ bytes begins at an address wherein the M least significant bits in the address are 0, the address of the Binary Buddy for a heap subregion 302A–302F can be determined by setting the N least significant bits of the address to zero and inverting the N+1 bit.

If the Binary Buddy is not found, the N bit 402 in the heap data structure 304 is set to 1 (step 606) and the address referred to by heapID is placed in the N list 407 (step 608), completing execution of the HeapFree(heapID, X) instruction.

On the other hand, if a Binary Buddy is found (in step 614), the entry 408 containing the address of the Binary Buddy is removed from the N list 407 (step 616). The N list 407 is checked to see whether it is empty after removing the entry 408 containing the Binary Buddy (step 618). If the N list 402 is empty, the N bit 402 is set to zero (step 620). In either case, the Binary Buddy and the heap subregion 302A–302F referred to by heapID are combined. The address of the first byte of either heapID or the Binary Buddy, whichever has the lowest address is used as the starting address of the new heap subregion 302A–302F. The value of N is incremented (step 624) and the process (steps 612–624) is repeated for the new heap subregion 302A–302F, until the largest possible heap subregion 302A–302F without an unassigned Binary Buddy is placed in the free list 306.

Based on the foregoing, those skilled in the art should now understand and appreciate that the invention provides an advantageous way to provide dynamic memory management, particularly in multiprocessing environments. Concurrent, non-blocking queues are used to list the available heap subregions which are available for assignment. Accordingly, application programs can concurrently access the heap data structure and the free list instead of having to block other applications. Because applications can concurrently access the heap data structure and the free list, the bottleneck associated with the allocation of memory in a multiprocessing environment is substantially curtailed. Another benefit of enabling application programs to concurrently access the heap data structure is that there is no longer a need for the operating system to arbitrate contention between two application programs attempting to allocate memory. Accordingly, the performance delay incurred when switching from the user mode of the application program to the kernel mode of the operating system is eliminated.

As will be recognized by those skilled in the art, the innovative concepts described in the present application can be modified and varied over a wide range of applications. Accordingly, the scope of the present invention should not be limited to any of the specific exemplary teachings discussed, but is only limited by the following claims.

What is claimed is:

1. In a computer system comprising an operating system, a plurality of application programs, and system memory, a method for allocating the system memory to the plurality of application programs, said method comprising the steps of:

executing an executable instruction within a first application program of a plurality of application programs, such that the first application program accesses a heap data structure and a free list, wherein the heap data structure and the free list comprise a concurrent non-blocking queue;

executing an executable instruction within a second application program of the plurality of application programs, such that the second application program accesses the heap data structure and the free list, the second application program accessing the heap data structure and the free list concurrently with the first application program to request a respective request amount of system memory for allocation to the first and second application programs;

identifying, based on the heap data structure and the free list, available portions of system memory, each of the available portions comprising at least the respective requested amount of system memory for each of the first and the second application programs; and allocating the respective requested amounts of system memory within the available portions to the first and the second application programs.

2. In a computer system comprising an operating system, a first application program and a second application program, and system memory, a system for allocating said system memory to the first and second application programs comprising:

a heap data structure for listing a size of at least one unallocated portion of the system memory;

a free list for listing at least one address of the at least one unallocated portion of the system memory, wherein the heap data structure and the free list comprise a concurrent non-blocking queue; and an executive instruction within the first and second application programs for accessing the free list and the heap data structure by the first and the second application programs, wherein the first application program accesses the free list and the heap data structure concurrently with the second application program to request a respective requested amount of the system memory for allocation to the first and second application programs.

* * * * *